United States Patent [19]

Middleton

[11] Patent Number: 4,895,651
[45] Date of Patent: Jan. 23, 1990

[54] PERSONAL, PORTABLE, DISPOSABLE TAP WATER FILTER

[76] Inventor: Glen H. Middleton, 2641 Meldrum Road, Windsor, Ontario, Canada, N8W4G8

[21] Appl. No.: 322,645

[22] Filed: Mar. 13, 1989

Related U.S. Application Data

[62] Division of Ser. No. 150,978, Feb. 1, 1988, Pat. No. 4,824,565.

[51] Int. Cl.$^4$ .............................................. B01D 00/00
[52] U.S. Cl. ................................... 210/266; 210/282; 210/290
[58] Field of Search ............... 210/222, 266, 282, 288, 210/290, 449, 459, 460, 461; 285/8, 110

[56] References Cited

U.S. PATENT DOCUMENTS

| | | | |
|---|---|---|---|
| 1,049,727 | 1/1915 | Jones | 210/449 |
| 3,255,691 | 6/1966 | Schwartz et al. | 210/449 |
| 3,515,413 | 6/1970 | Beall | 285/8 |
| 3,844,586 | 10/1974 | Olen | 285/8 |
| 4,316,623 | 2/1982 | Kelly | 285/8 |

Primary Examiner—Charles Hart
Attorney, Agent, or Firm—Remy J. VanOphem

[57] ABSTRACT

A portable tap water filter having an upper portion including a resilient faucet connection member and having a lower portion including filtration media. The portable tap water filter is removably attached to a faucet head at an interior annular lip. The interior annular lip is expandable to aid mounting and removal by movement of a plurality of ribs within the upper portion about a fulcrum location when the user squeezes the upper portion below the fulcrum location. A state-of-the-art filtration system is resident in the lower portion. A water stream regulation structure is included having a baffle, a saucer which centrally eclipses the lower portion and a plurality of drill holes annularly arranged around the periphery of the saucer.

4 Claims, 1 Drawing Sheet

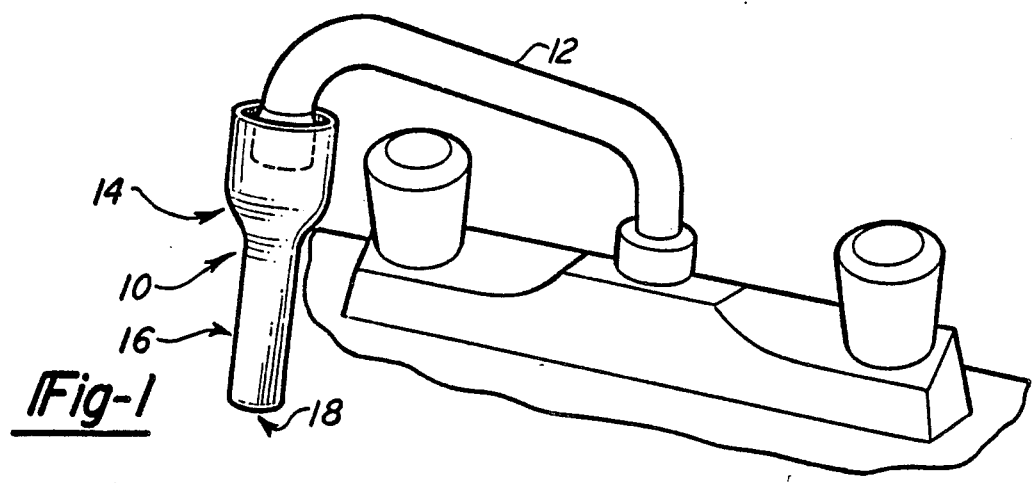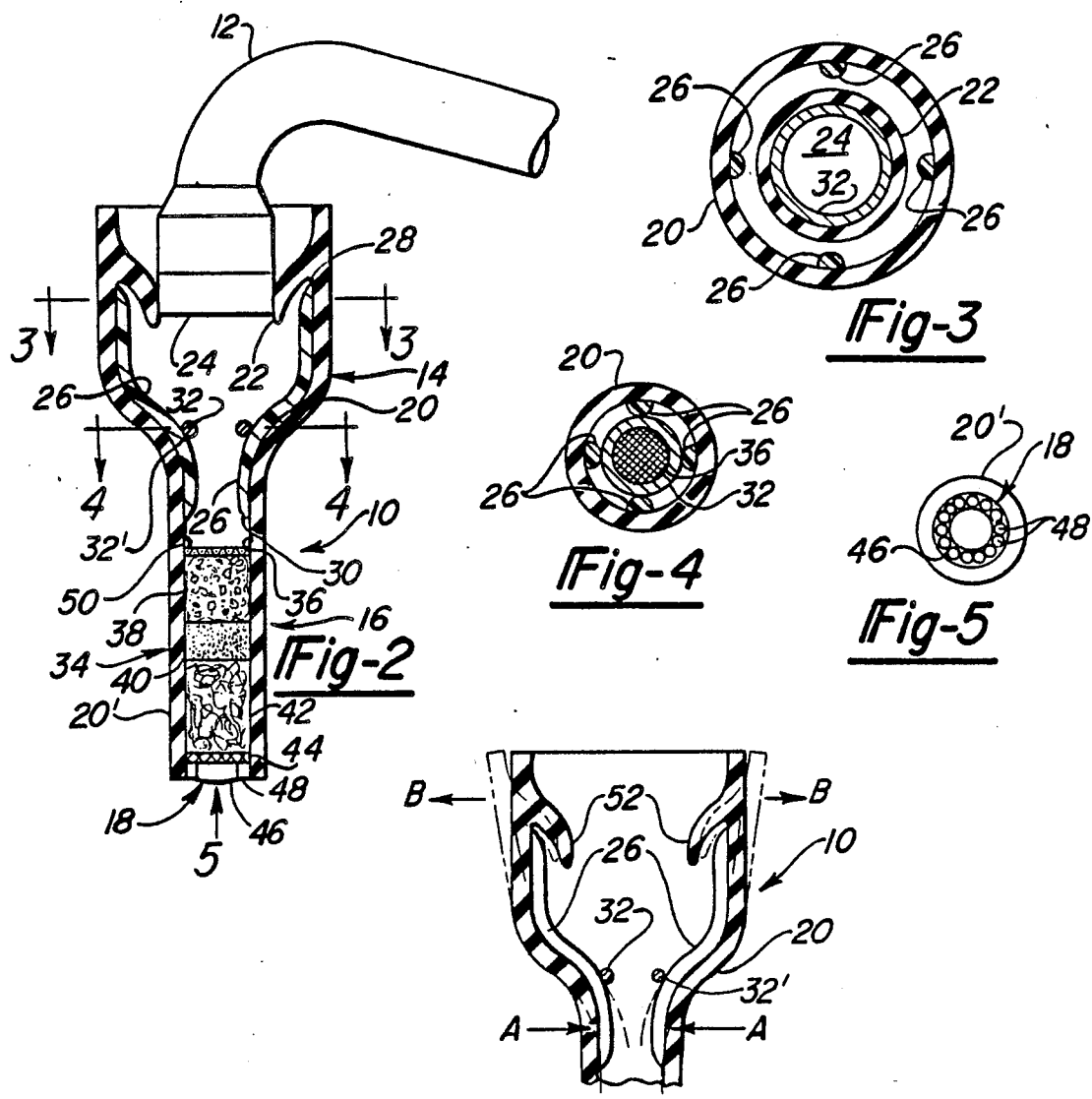

PERSONAL, PORTABLE, DISPOSABLE TAP WATER FILTER

This is a division of application Ser. No. 150,978 filed Feb. 1, 1988, now U.S. Pat. No. 4,824,565.

BACKGROUND OF THE INVENTION

1. FIELD OF THE INVENTION

This invention relates to water filters, particularly tap water filters which are constructed to removably mount onto a drinking water faucet.

2. DESCRIPTION OF THE PRIOR ART

Increasingly, the quality of drinking water has become a vital concern for a growing segment of the population. Today, with reports of environmentally unsafe material contaminating ground water, there is every reason for persons to suspect the water that they consume. This concern extends beyond well water systems to include many municipal water systems which were built at a time when bituminous pitch was used to line water pipes as a corrosion preventative measure. Consequently, it is possible that water received at a tap water faucet may contain any number of undesirable contaminants, including solid debris, chemical contamination, and biological contamination.

There are several ways to ensure that drinking water is potable. One way is to purchase distilled water or water which is guaranteed pure from an uncontaminated spring. This proves to be too expensive and generally impractical for most people. A second way is to purchase a personal water distillation unit. While it is the case that these units are becoming increasingly more common, their extreme inconvenience and expensiveness point out the pervasiveness of the water quality problem which is growing more alarming each day. A third, and most reasonable, way is to purchase a filter which is relatively inexpensive to filter water at the tap. This would be particularly useful if it is in the form of a portable filter so that it may be mountable to any tap water faucet as the need may arise.

The concept of filtering drinking water at the tap was proposed by Johnston, U.S. Pat. No. 727,374, issued May 5, 1903. Johnston's device is of generally cylindrical shape including a faucet attachment portion having internal threads for threading onto external threads of a faucet. A filtering portion is disposed downstream from the faucet attachment location. The filtering portion contained, in sequential order from the faucet attachment location, a perforated metal sheet, a filtering media and, finally, a hemispherically-shaped filter-plate or wire-gauze. While the device taught by Johnston is practical for a permanent installation, it is not practical for a portable, disposable water filter which can allow anyone to carry it with them and be very easily installed and removed whenever the need is presented, such as when the user is out of town in a hotel room, or when the user is at work.

Other tap water filter systems which have been proposed, but are impractical as a portable, disposable tap water filter because of the size and complexity of their structure, are: U.S. Pat. No. 1,287,755 to Rorer which utilizes dual shaped pipes; U.S. Pat. No. 1,774,004 to Haslett which discloses a multi-segmented filter; U.S. Pat. No. 2,314,357 to Lehman which discloses a filter selective between a spray and a stream setting; U.S. Pat. No. 3,204,770 to Brink which discloses a clampable faucet fitting and a channel filter to ensure complete water flow therethrough; U.S. Pat. No. 3,760,951 to Mansfield which discloses a threaded cone which must be screwed into a particular faucet in order for the filter to be attachable to the faucet; U.S. Pat. No. 4,001,120 to Gelman et al which discloses a structure that screws into the aerator threads or a faucet and has a valve to selectively bypass filtering in order to extend the filter life; and finally, U.S. Pat. No. 4,288,325 to Lieberman which discloses a threadable faucet attachment structure and a filter having selectable water stream or spray output.

Tap water filter systems which are less structurally complicated, but yet are still impractical as a portable, disposable tap water filter either because the connection structure to the faucet requires too much effort to force a resilient member onto the faucet or because of potential damage to the faucet as mounting set screws are tightened, are: U.S. Pat. No. 2,328,381 to Jaffe which discloses a tap water filter having a faucet connection structure utilizing set screws for fastening thereto; U.S. Pat. No. 2,368,035 to Moore which discloses a faucet connection structure utilizing an annular lip which is retained by a cap unit; U.S. Pat. No. 3,255,691 to Schwartz et al which discloses a beverage flavoring device having a resilient member which is mountable on a nozzle; and, finally, U.S. Pat. No. 3,707,236 to Takebayasi which discloses a resilient cap having an inner resilient cylinder structured to mount onto a faucet.

What is needed in the art is a practical, portable, disposable tap water filter for personal use which is easily and readily mountable to and removable from any tap water faucet as the need may arise. Accordingly, such a tap water filter must be small, uncomplicated, inexpensive, not damaging to the faucet, and very easy to mount on and to remove from the faucet.

SUMMARY OF THE INVENTION

The present invention is a tap water filter which is structured to enable it to be easily mounted to and subsequently removed from a faucet with little or no effort. More particularly, the present invention is a tap water filter having features which allow it to be repeatedly mounted to and removed from any number of faucets, thus, allowing its use to always drink tap water which has been filtered.

The structure of the present invention includes an upper portion and a lower portion. The upper and lower portions are preferred to be constructed of one piece, although this is not necessary. The preferred material for the wall of the upper portion is a resilient elastomer plastic or rubber. The upper portion has a generally funnel shape, while the lower portion has a generally cylindrical shape.

The upper portion has an internal annular lip which is made of a resilient material. Preferably, the internal annular lip is integral with the wall of the upper portion. Within the upper portion and attached to the wall of the upper portion are a plurality of ribs made of a generally inflexible material. The ribs extend from the internal annular lip to the end of the lower portion remote from the internal annular lip. A preferred number of ribs is four, each being annularly spaced around the inside of the wall of the upper portion. A fulcrum ring is adjacent to the ribs and positioned at a location remote from the ends of the ribs. When the user squeezes the ribs adjacent the lower portion, the ribs tend to separate adjacent the internal annular lip by a lever action at the fulcrum, thereby causing the internal annular lip to expand. Thus, the internal annular lip may be effortlessly mounted on or removed from the faucet by expanding it.

The lower portion includes a filtering media, such as activated charcoal and cloth filter material. At the end of the lower portion, where the tap water exits from the tap water filter, a base member is positioned within the cylindrical wall of the lower portion. The base member includes a saucer that is centrally positioned to eclipse the majority of the inside diameter of the base. Annularly spaced around the periphery of the saucer are drill holes which permit tap water to exit therethrough. The saucer and drill holes regulate water flow through the filter so that a maximum filtering action is achieved.

Accordingly, it is an object of the present invention to provide a portable, disposable tap water filter suitable for personal use.

It is a further object of the present invention to provide a portable, disposable tap water filter which is easily mounted to and removed from faucets and which is not subject to excess wear and abrasion caused by repeated mounting and removal from the faucets.

It is yet a further object of the present invention to provide a portable, disposable tap water filter which includes a simple structure which effectively regulates water flow therethrough to ensure proper filtering.

It is still a further object of the present invention to provide a portable, disposable tap water filter which is inexpensive, compact and readily usable.

These and other objects, advantages, features, and benefits of the present invention will become apparent from the following specification.

BRIEF DESCRIPTION OF THE DRAWINGS

FIG. 1 is a perspective view of the present invention in operation;

FIG. 2 is a part sectional side view of the invention in operation;

FIG. 3 is a sectional view taken along lines 3—3 in FIG. 2;

FIG. 4 is a sectional view taken along lines 4—4 in FIG. 2;

FIG. 5 is an end view taken along arrow 5 in FIG. 2; and

FIG. 6 is a part sectional side view showing a response of the upper portion of the tap water filter according to the present invention to being squeezed.

DETAILED DESCRIPTION OF THE PREFERRED EMBODIMENT

Referring now to the figures, FIG. 1 shows a portable tap water filter 10 according to the present invention in operation. It will be seen from the figure that the tap water filter 10 is attached to a faucet 12. The portable tap water filter 10 is composed of a generally funnel-shaped upper portion 14 and a generally cylindrically-shaped lower portion 16. The upper portion 14 is constructed of a resilient material, such as rubber or an elastomer plastic. It is preferred that the lower portion 16 be formed integrally with the upper portion, as shown in the FIG. 1. However, the lower portion 16 may be a separate element which is attached to the upper portion 14 in a conventional manner, such as by gluing or clamping. It may be appreciated from the relative sizes of the components depicted in FIG. 1, that the approximate length of the portable tap water filter 10 is on the order of several inches. Water from the faucet enters the portable tap water filter 10 at the upper portion 14 and exits at the lower portion 16 via a base 18.

The structure of the portable tap water filter 10 can be understood by reference to FIGS. 2 through 5. FIG. 2 depicts the preferred construction of the portable tap water filter 10 in which the upper portion 14 and the lower portion 16 are integral.

The upper portion 14 has a resilient wall 20 which includes an integral interior annular lip 22 forming an annulus 52 which is structured to sealingly mate with a faucet head 24 when inserted thereinto as shown in FIG. 2. A plurality of ribs 26 are secured to the interior of the resilient wall 20 of the upper portion 14. In the figures, four ribs are depicted. The ribs 26 are made of a generally inflexible material which resists corrosion, such as a structural plastic or nylon. The ribs 26 follow the shape of the resilient wall 20 and are secured thereto by a conventional method, such as a nontoxic adhesive or by being formed thereinto. It will be seen by reference to FIG. 2 that the ribs preferably extend from a first end 28 adjacent the interior annular lip 22 to a second end 30 adjacent the lower portion 16. A fulcrum ring 32 is attached to the ribs at a location between the aforesaid ends of the ribs, preferably at a fulcrum location 32' remote from the first and second rib ends 28 and 30, as shown in FIG. 2, by a conventional method, such as a nontoxic adhesive, a snap fit, or by being formed as a single piece with the ribs. The fulcrum ring may be made out of any noncorrosive structurally nondeformable material, such as a structural plastic or nylon. FIGS. 3 and 4 are planar views taken through the upper portion 14 which further show the structural interrelationships within the upper portion. The lower portion 16 has a resilient wall 20' which is integral with the resilient wall 20 of the upper portion 14. Within the resilient wall 20' there is located a filtration system 34 and the base 18 for regulating water flow through and out of the portable tap water filter 10. The filtration system 34 is of a conventional, state-of-the-art type which is intended to remove solid debris as well as other undesirable contaminants from the water flowing therethrough. By way of example and not by limitation, the filtration system shown in FIG. 2 includes the following components in sequential order from the upper portion 14: a screen mesh 36 for removing solid debris; three layers for contaminant removal including an activated charcoal cloth layer 38, a sand layer 40, and a cloth filter layer 42; and, finally, a baffle 44 made preferably of plastic for ensuring even water flow through the filter layers. The base 18 includes a saucer 46 located at the axial center of the lower portion 16, as well as a plurality of drill holes 48 which are annularly arranged around the periphery of the saucer and within the resilient wall 20'. The filtration system 34 is held in place within the lower portion 16 by nibs 50 and by any conventional fastening means at the base 18, such as a nontoxic or a snap fit. FIG. 5 is an end view which particularly shows the structure of the base.

Operation of the portable tap water filter 10 will now be described with particular reference to FIG. 6. The user conveniently carries the compact structure of the portable tap water filter 10 in, for example, a purse or pocket. When drinking water is desired, the user simply takes hold of the portable tap water filter and squeezes it at a locatioan adjacent the ribs 26, remote from both the anterior annular lip 22 and the fulcrum ring 32, as indicated by arrows A. The resilient wall 20 allows the ribs to move inward in response to being squeezed below the fulcrum ring. The fulcrum ring, positioned at the fulcrum location 32', cooperates with each of the ribs, causing the ribs to swing outwardly on the opposite side of the fulcrum ring, as would occur with a lever. This outward movement of the ribs above the fulcrum ring results in the resilient member being stretched adjacent the interior annular lip 22, as indicated by arrows B. It will be seen by the phantom lines in FIG. 6 that the result of squeezing the upper portion at arrows A causes the resilient wall 20 to expand at arrows B, thus increasing the diameter of the annulus 52 of the interior annular lip 22. To mount the portable tap water filter 10, the user simply pushes the portable tap water filter 10 upwardly onto the faucet head while squeezing as aforesaid. The increased diameter of the annulus 52 greatly reduces the amount of force that is necessary to mount the interior annular lip onto the tap water faucet head. Additionally, the interior annular lip is spared from fatigue that would result from repeated mounting and removal on various faucets encountered during daily life. Releasing the portable tap water filter 10 causes the resilient wall 20 to spring back and the interior annular lip to seal tightly on the faucet head. To remove the portable tap water filter 10, the user simply squeezes the upper portion at arrows A and then pulls downwardly, away from the faucet head. Thus, what results is a practical, portable tap water filter that is personal to the user because the user may readily mount it whenever needed and easily remove it immediately upon being finished.

To filter tap water after the portable tap water filter 10 has been seated on the faucet head 24, the tap water is simply turned on in the usual manner. The tap water will then run through the filtration system 34 without any need of adjustment by the user. The tap water will exit out the base 18 through the drill holes 48. The baffle 44 in combination with the saucer 46 and the drill holes 48 ensures an even filtration action of the tap water through the filtration system.

The portable tap water filter 10 is preferably structured for inexpensive manufacture, so that it may be disposed of when the filtration media has become clogged. Accordingly, the user need not bother with replacing or adjusting the interior filtration media, although replaceable filtration media can, of course, be incorporated within the scope of the present invention.

To those skilled in the art to which this invention appertains, the above described preferred embodiment may be subject to change or modification. For instance, although it is preferred to use a funnel-shaped structure for the upper portion 14, this is not a requirement since the ribs 26 in combination with the fulcrum ring 32 could operate with any shape upper portion. Further, other fulcrum devices could be used other than a ring, such as a crisscross structure which unites each of the ribs. Such changes or modifications can be carried out without departing from the scope of the invention, which is intended to be limited only by the scope of the appended claims.

What is claimed is:

1. A method for mounting a fluid connector to a cylindrical member wherein said fluid connector has a resilient annular lip radially expandable in response to squeezing said fluid connector at a predetermined location displaced from said resilient annular lip, said method comprising the steps of:
   radially squeezing said fluid connector at said predetermined location to radially expand said resilient annular lip;
   inserting said radially expanded resilient annular lip over said cylindrical member; and
   terminating the squeezing of said fluid connector to allow said resilient annular lip to radially contract compressably sealing said fluid connector on said cylindrical member.

2. The method of claim 1 wherein said fluid connector has a rigid fulcrum member disposed intermediate said resilient annular lip and said predetermined location, said step of squeezing comprises squeezing said fluid connector at said predetermined location which is spaced from said rigid fulcrum member on the side opposite said resilient annular lip to radially expand said resilient annular lip.

3. The method of claim 2, wherein said fluid connector has a plurality of longitudinal ribs pivotably attached to said rigid fulcrum member and extending from approximately said resilient annular lip to said predetermined location, said step of squeezing comprises squeezing said fluid connector to radially displace the ends of said plurality of longitudinal ribs at said predetermined location inwardly to expand said resilient annular lip.

4. The method of claim 1 further comprising the steps of:
   squeezing said fluid connector at said predetermined location a second time to radially expand said resilient annular lip to release the compression seal between said resilient annular lip and said cylindrical member; and
   withdrawing said fluid connector away from said cylindrical member to disconnect said fluid connector from said cylindrical member.

* * * * *

UNITED STATES PATENT AND TRADEMARK OFFICE
CERTIFICATE OF CORRECTION

PATENT NO. : 4,895,651
DATED : January 23, 1990
INVENTOR(S) : Glen H. Middleton It is certified that error appears in the above-identified patent and that said Letters Patent is hereby corrected as shown below:

Column 1, line 52, delete "or" and insert ---- of ----.

Column 2, line 6, delete "or" and insert ---- of ----.

Column 2, line 45, delete "use" and insert ---- user ----.

Column 4, line 58, after "toxic" insert ---- adhesive ----.

Signed and Sealed this

First Day of January, 1991

*Attest:*

HARRY F. MANBECK, JR.

*Attesting Officer*  *Commissioner of Patents and Trademarks*